United States Patent
Neese et al.

(10) Patent No.: US 10,365,390 B2
(45) Date of Patent: Jul. 30, 2019

(54) SYSTEM AND METHOD FOR ACQUIRING AND PROCESSING ELECTROMAGNETIC SURVEY DATA IN HYDROCARBON EXPLORATION

(71) Applicant: University of Houston System, Houston, TX (US)

(72) Inventors: John W. Neese, Houston, TX (US); Leon Thomsen, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 123 days.

(21) Appl. No.: 15/520,222

(22) PCT Filed: Oct. 20, 2015

(86) PCT No.: PCT/US2015/056372
§ 371 (c)(1),
(2) Date: Apr. 19, 2017

(87) PCT Pub. No.: WO2016/064812
PCT Pub. Date: Apr. 28, 2016

(65) Prior Publication Data
US 2017/0315254 A1    Nov. 2, 2017

Related U.S. Application Data

(60) Provisional application No. 62/066,126, filed on Oct. 20, 2014.

(51) Int. Cl.
*G01V 3/00*    (2006.01)
*G01V 3/08*    (2006.01)
(Continued)

(52) U.S. Cl.
CPC ........ *G01V 3/083* (2013.01); *E21B 47/02216* (2013.01); *E21B 47/0905* (2013.01);
(Continued)

(58) Field of Classification Search
CPC . G01V 3/083; G01V 3/12; G01V 3/26; G01V 3/30; G01V 3/38; E21B 47/0905; E21B 47/02216
See application file for complete search history.

(56) References Cited

U.S. PATENT DOCUMENTS

7,397,728 B2 *  7/2008  Moore .................. G01V 1/364
                                                        367/38
7,502,690 B2 *  3/2009  Thomsen ............... G01V 3/083
                                                        367/21
(Continued)

OTHER PUBLICATIONS

International Patent Application No. PCT/US2015/056372 International Search Report and Written Opinion dated Jan. 11, 2016 (17 pages).

*Primary Examiner* — Minh N Tang
(74) *Attorney, Agent, or Firm* — Conley Rose, P.C.

(57) ABSTRACT

Systems and methods for acquiring and processing electromagnetic data in subsurface formations. In one example, a system includes an electromagnetic source, a plurality of electromagnetic receivers, and an electromagnetic data processor. The electromagnetic source is configured to generate an electromagnetic pulse that induces electromagnetic energy in subsurface formations. The electromagnetic receivers are configured to detect the electromagnetic energy reflected by the subsurface formations, and to output signals corresponding to detected electromagnetic energy reflected by the subsurface formations. The electromagnetic data processor configured to process, based on differences in travel times of the electromagnetic energy between the subsurface formations and the electromagnetic receivers, the signals output by the electromagnetic receivers. The electromagnetic data processor is further configured to produce a representation of the subsurface formations based on processed signals output by the electromagnetic receivers.

29 Claims, 16 Drawing Sheets

(51) Int. Cl.
    *G01V 3/18*     (2006.01)
    *G01V 3/38*     (2006.01)
    *E21B 47/022*     (2012.01)
    *E21B 47/09*     (2012.01)
    *G01V 3/12*     (2006.01)
    *G01V 3/26*     (2006.01)
    *G01V 3/30*     (2006.01)

(52) U.S. Cl.
    CPC ............... *G01V 3/12* (2013.01); *G01V 3/18* (2013.01); *G01V 3/26* (2013.01); *G01V 3/30* (2013.01); *G01V 3/38* (2013.01)

(56) References Cited

U.S. PATENT DOCUMENTS

| | | | |
|---|---|---|---|
| 8,633,700 B1 * | 1/2014 | England | G01V 3/12 |
| | | | 324/348 |
| 9,239,397 B2 * | 1/2016 | Thompson | G01V 1/20 |
| 2005/0190650 A1 | 9/2005 | Ferber et al. | |
| 2008/0033655 A1 | 2/2008 | Ozbek et al. | |
| 2009/0116336 A1 | 5/2009 | Summerfield et al. | |
| 2009/0204330 A1 | 8/2009 | Thomsen et al. | |
| 2009/0292476 A1 | 11/2009 | Abma | |

\* cited by examiner

FIG. 3
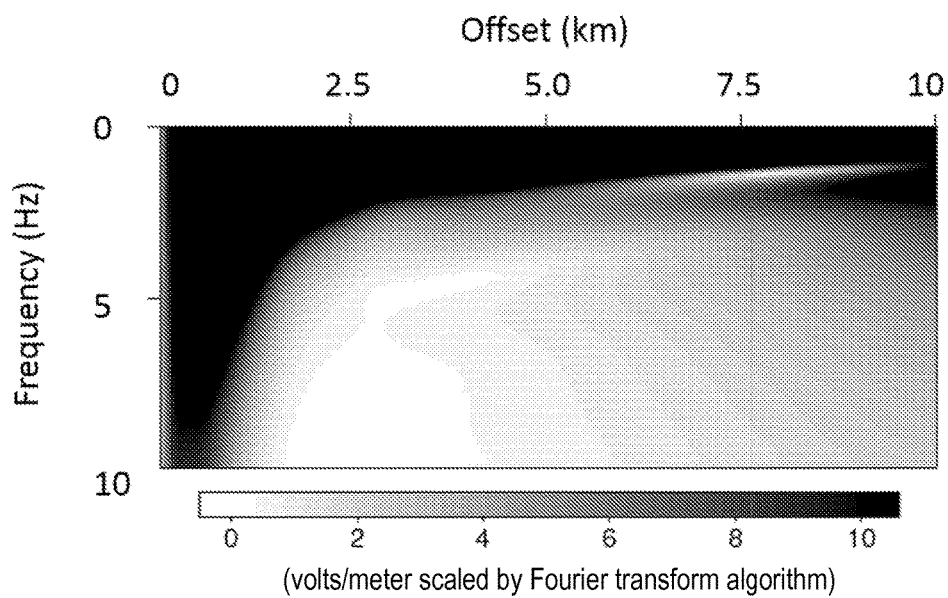
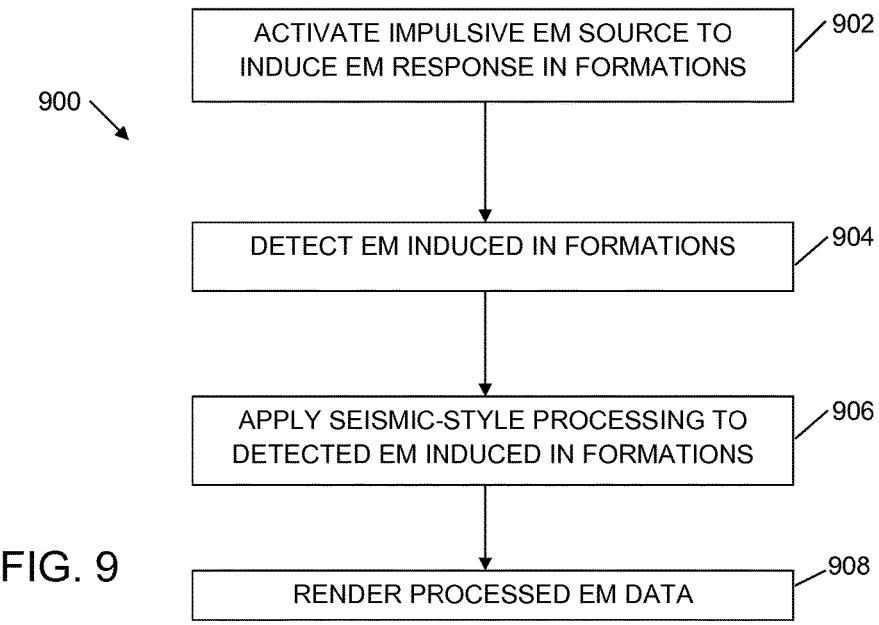
FIG. 9

(normalized volts/meter)

(normalized volts/meter)

(normalized volts/meter scaled by Fourier transform algorithm)

(normalized volts/meter scaled by Fourier transform algorithm)

(normalized volts/meter)

(normalized volts/meter)

(normalized volts/meter)

(normalized volts/meter)

SYSTEM AND METHOD FOR ACQUIRING AND PROCESSING ELECTROMAGNETIC SURVEY DATA IN HYDROCARBON EXPLORATION

CROSS-REFERENCE TO RELATED APPLICATIONS

The present application is a 35 U.S.C. § 371 national stage entry of PCT/US2015/056372, filed on Oct. 20, 2015, entitled "System and Method for Acquiring and Processing Electromagnetic Survey Data in Hydrocarbon Exploration," which claims priority to U.S. Provisional Patent Application No. 62/066,126, filed on Oct. 20, 2014, entitled "System and Method for Processing Electromagnetic Survey Data," each of which is hereby incorporated herein by reference in its entirety.

BACKGROUND

Various techniques are applied in the mapping of subsurface formations for hydrocarbon exploration. Seismic techniques extract information about subsurface structures from anelastic (i.e., approximately elastic) energy reflected and/or refracted by the subsurface structures. Electromagnetic techniques measure electromagnetic fields induced in subsurface structures and extract information about the structures from the fields. Included in the information (in both techniques) is information concerning the fluid content of the pore space within the formations.

SUMMARY

Methods and systems for acquiring electromagnetic data representative of subsurface formations, and processing the acquired data are disclosed herein. In some embodiments, a method for acquiring and processing electromagnetic data in subsurface formations includes generating an electromagnetic pulse using an electromagnetic source at selected locations to induce electromagnetic energy propagation in the subsurface formations. The electromagnetic energy returned from the subsurface formations is detected using a plurality of electromagnetic receivers. A representation of the subsurface formations is produced by processing signals output by the electromagnetic receivers. The processing is based on differences in travel times of the electromagnetic energy between the subsurface formations and the electromagnetic receivers, according to distance between the source and each receiver. The processing accounts for the strong attenuation and/or dispersion of electromagnetic propagation in the subsurface formations. The representation of the subsurface formations is utilized to detect and characterize presence of hydrocarbons in the subsurface.

In other embodiments, a system for acquiring and processing electromagnetic data includes an electromagnetic source, a plurality of electromagnetic receivers, and a processor. The electromagnetic source is configured to generate an electromagnetic pulse that induces electromagnetic energy in subsurface formations. The electromagnetic receivers are configured to detect the electromagnetic energy returned from the subsurface formations, and to output signals corresponding to detected electromagnetic energy returned from the subsurface formations. The processor is configured to process the signals output by the electromagnetic receivers. The processing is based on differences in travel times of the electromagnetic energy between the subsurface formations and a plurality of the electromagnetic receivers, and accounts for dispersion and/or attenuation of electromagnetic energy propagation in the subsurface formations. The processor is also configured to produce a representation of the subsurface formations based on processed signals output by the electromagnetic receivers.

In further embodiments, a non-transitory computer-readable medium encoded with instructions that when executed by a processor cause the processor to receive signals detected by a plurality of electromagnetic receivers. The signals correspond to electromagnetic energy reflected by subsurface formations and detected by the electromagnetic receivers. The instructions, when executed, also cause the processor to process the signals based on differences in travel times of the electromagnetic energy between the subsurface formations and the electromagnetic receivers, and accounting for dispersion and/or attenuation of electromagnetic energy propagation in the subsurface formations.

BRIEF DESCRIPTION OF THE DRAWINGS

For a detailed description of various examples, reference will now be made to the accompanying drawings in which:

FIG. 3 shows a frequency spectrum for the canonical model disclosed herein;

FIG. 9 shows a flow diagram for a method for acquiring and processing EM data in accordance with principles disclosed herein.

NOTATION AND NOMENCLATURE

Figure 1:
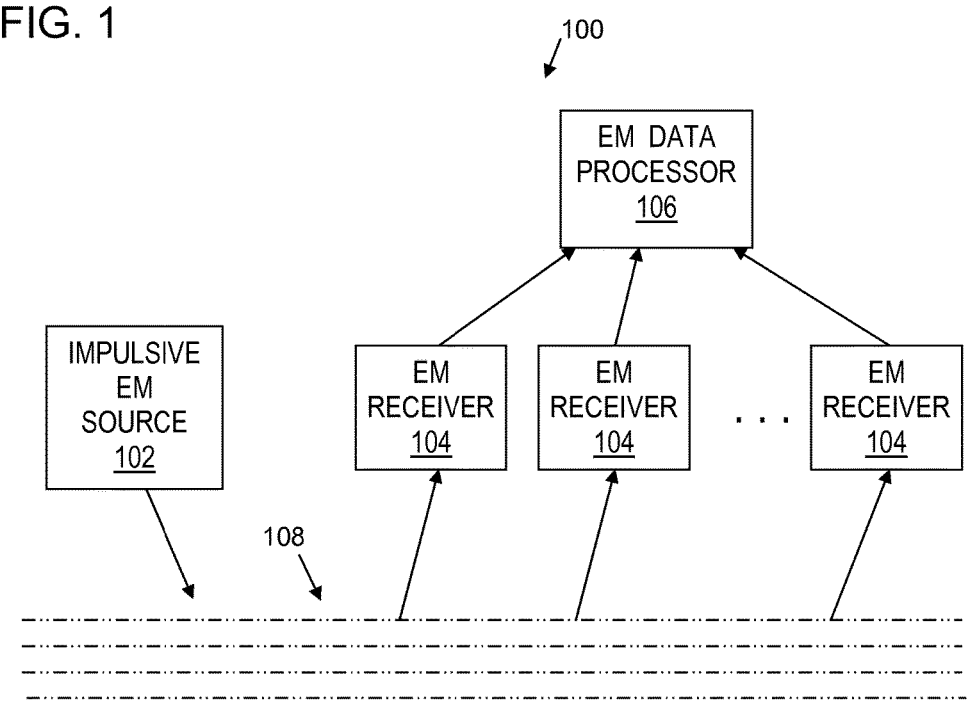
FIG. 1 shows a block diagram of a system 100 for acquiring and processing EM data in accordance with principles disclosed herein.

Certain terms are used, throughout the following description and claims, to refer to particular system components. As one skilled in the art will appreciate, different organizations and individuals may refer to a component by different names. In the following discussion and in the claims, the terms "including" and "comprising" are used in an open-ended fashion, and thus should be interpreted to mean "including, but not limited to . . . ." The recitation "based on"

is intended to mean "based at least in part on." Therefore, if "X is based on Y", then X may be based on Y and any number of other factors.

DETAILED DESCRIPTION

The following discussion is directed to various embodiments of the invention. One skilled in the art will understand that the following description has broad application, and the discussion of any embodiment is meant only to be exemplary of that embodiment, and not intended to intimate that the scope of the disclosure, including the claims, is limited to that embodiment.

Conventional methods for acquiring and processing Continuous Source Electro-Magnetic (CSEM) survey data are very different from those applied to seismic data. At low frequencies, electromagnetic ("EM") propagation follows the diffusion equation, whereas anelastic seismic propagation follows the wave equation. Despite such fundamental differences, many of the methods developed in the context of seismic exploration may be used, perhaps with modification, with EM exploration. Hence, embodiments of the present disclosure apply methods of seismic acquisition and processing to electromagnetic (EM) data.

Embodiments disclosed herein recognize various similarities between seismic and EM data. Both seismic and EM wave types may be described as a Fourier superposition of plane waves. The wave vectors in both cases have real and imaginary parts, which lead to dispersive, attenuative propagation. Hence, although seismic dispersion and attenuation are weak, whereas EM dispersion and attenuation are strong, seismic processing algorithms which do not assume weak dispersion or attenuation may be applicable to processing of properly acquired EM data. Further, seismic processing algorithms may be modified to deal with the strong dispersion and attenuation of properly acquired EM waves.

Embodiments of the present disclosure may directly "image" (in the seismic sense) EM data using seismic-like techniques, rather than mathematically inverting for the subsurface physical parameters of a pre-conceived model, as per conventional CSEM processing methods. Thus embodiments provide various advantages over conventional EM data processing techniques. These advantages include reduced sensitivity to source strength and orientation.

Note that the term "CSEM" is conventionally understood to mean "Controlled Source ElectroMagnetics", whereas in the present disclosure the abbreviation CSEM denotes "Continuous Source ElectroMagnetics" because the conventional style of control includes sourcing of electromagnetic signal continuously (or effectively continuously) in time, e.g., via a square wave source. Because the EM signal from the subsurface is weak (just as the subsurface signal in seismic exploration is weak), embodiments disclosed herein detect EM signal without a concurrent active source, thereby enabling surface (or near-surface) recording without interference from a concurrent source. That is, EM data employed with embodiments of the present disclosure may be Impulsive-Source ElectroMagnetics (ISEM), or processed to be effectively impulsive, rather than Continuous-Source (CSEM) data (just as in seismic exploration the seismic source is impulsive, or processed to be effectively impulsive). For example, the impulse can be a sudden change in voltage (a sudden step up or down) across the source antenna, with constant voltage for some extended "dwell time" before and after the step; if the resulting data are numerically differentiated with respect to time, the source is effectively impulsive. Such impulsive sources are of course "Controlled", and so are included within the broad meaning of "Controlled Source ElectroMagnetics", which is why the present disclosure re-defines the acronym "CSEM" above. Such impulsive EM sources have been proposed previously, but with spatially aliased receivers (see above), and with data processing by mathematical inversion, similar to that described above.

Further, in embodiments disclosed herein the EM receivers must be spatially and temporally un-aliased. This may require closer spacing of the receivers, and/or more receivers, than is conventional in CSEM.

The phase velocities of EM waves at low frequencies (~1 Hz) are comparable to seismic velocities (several km/s). Consequently, seismic-style acquisition parameters are feasible, and "moveout" of the EM signal is observable, given appropriate acquisition. The moveout is the progressive delay (following initiation of the impulsive source) in arrival of the signal, at further offsets. Although the moveout of seismic reflection data is approximately hyperbolic in time, the moveout of EM data may be more linear in time.

The further offsets in both seismic and EM data have weaker amplitudes. Therefore, to compare with nearer offsets, embodiments may apply seismic-style amplification, such as trace normalization or other gain control, prior to processing. Computation of "apparent subsurface resistivity", as is commonly done in CSEM, is not required.

Electrical resistivity is a physical parameter that controls the velocity of electromagnetic waves in the subsurface, and may be indicative of the presence of hydrocarbons in the subsurface. Since subsurface hydrocarbon reservoirs have anomalously high electrical resistivity, EM waves traveling though such hydrocarbon reservoirs travel anomalously faster. The techniques disclosed herein detect the reservoirs primarily through their effect on EM moveout velocities, rather than on their amplitudes, as with conventional EM inversion.

Embodiments exploit the moveout of ISEM data via application of seismic-style workflows, for example:

a) conventional and/or modified velocity (semblance) analysis and stacking; and/or b) conventional and/or modified f-k transform and filtering; and/or c) conventional and/or modified Radon transformation.

Of these, the Radon transform may be most useful for detecting the presence of hydrocarbons in the subsurface. Further, embodiments may apply a modification of the Radon transform (disclosed herein) to produce useful representations of the subsurface values of electrical resistivity itself. Other seismic-style workflows may also be modified to produce estimates of electrical resistivity itself, not merely moveout velocity.

FIG. 1 shows a block diagram of a system 100 for acquiring and processing EM data in accordance with principles disclosed herein. The system 100 includes an EM source 102, EM receivers 104, and EM data processor 106. The EM source 102 generates EM energy that propagates through the formations 108. In some embodiments, the EM source 102 may be an impulsive in-line horizontal electric current dipole with positive or negative polarity. In some embodiments, the source may be a cross-line dipole, or a vertical dipole. In other embodiments, the EM source may differently configured (those familiar with the art will understand that there are many possible configurations). The receivers 104 are antennae that detect electromagnetic energy induced in the formations 108 by the signals generated by the EM source 102. In some embodiments, the receivers 104 may be in-line horizontal dipole antennae; in others, the receivers may be cross-line horizontal dipoles, vertical dipoles, magnetic loops in various orientations, or combinations thereof.

In some embodiments, the entire system 100 may be submerged underwater, for example under seawater. In some embodiments, the source 102 may be towed several meters above the seafloor; in others it may be towed close to the surface of the water. In some embodiments, the receivers 104 are deployed on the seafloor (in a line or across an area (thus enabling 3-Dimensional exploration)); in other embodiments the receivers 104 may be suspended in the water column above the seafloor.

The EM data processor 106 is a processing system that receives EM data acquired by the EM receivers 104, and manipulates the acquired EM data to extract information about the formations 108, and/or to produce representations of the formations 108.

For illustrative purposes, the system 100 is considered herein in conjunction with a 1 dimensional "canonical model" of the subsurface that includes a semi-infinite upper half space of air (resistivity $\rho=10^{12}$ Ohm-m), over ocean ($\rho=0.3$ Ohm-m) 1 kilometer (km) deep, over brine-saturated sediments ($\rho=1.0$ Ohm-m) 1 km thick, over reservoir rock ($\rho=100.0$ Ohm-m) 100 meters (m) thick, over a semi-infinite lower half space of brine-saturated sediments. This particular subsurface model has been used in a number of studies of CSEM, and embodies parameters which are appropriate in the context of hydrocarbon exploration. For imaging the model, the source 102 may (as is conventional) be a unit horizontal electric dipole antenna that is oriented in-line with the receivers 104 and that may be positioned 50 meters above the sea floor. In some embodiments, the receivers 104 may include 200 in-line horizontal electric dipole antennae, stationed from 50 m to 10 km offset (e.g., at 50 m intervals) along the ocean bottom. For this illustration, the receiver dipoles are oriented in the opposite direction to the source dipole. The system 100 may acquire EM data with a 10 second recording time at a 2 millisecond sampling interval. Some embodiments may apply a different (e.g., longer or shorter) receiver spacing and/or different (e.g., longer or shorter) minimum and maximum offsets. Some embodiments may apply a different (e.g., longer or shorter) sampling interval, and/or different (e.g., longer or shorter) minimum and maximum recording times.

A second "shallow water model" is also discussed herein. The shallow water model is similar to the canonical model, but sets an ocean depth of 500 m instead of the greater depth (1000 m) used in the canonical model.

FIGS. 2A-2D show numerical simulations of ISEM data, computed conventionally for subsets of the canonical model described above. The data is presented seismic-style, with each time trace (at each offset) normalized to unit maximum amplitude, which makes the weak far-offset signal visible, without computation (EM-style) of apparent resistivity. Also, the figures have smooth interpolation between the discretely computed samples (in offset and time), in order to resemble continuous sampling; this is conventional practice.

The numerical simulation shown contains only numerical noise, with no simulation of physical noise. Other simulations (not shown) including physical noise, show that plausible levels of noise do not interfere with the present analysis (despite the amplification applied), particularly if the noise is not source-generated (i.e., does not show moveout), and if it has higher frequency than the data.

Figure 2A:
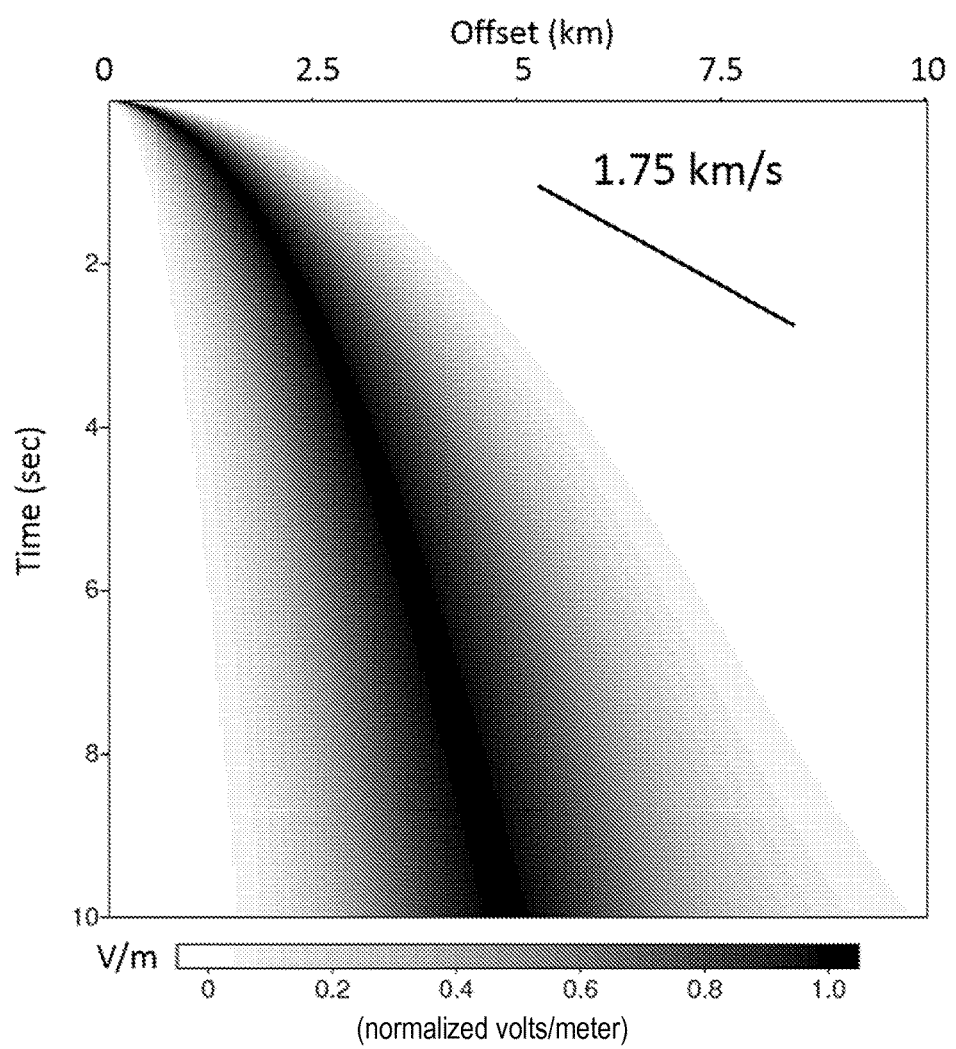
FIGS. 2A-2H show simulations of buildup of models applied to illustrate operation of embodiments disclosed herein.
Figure 2B:
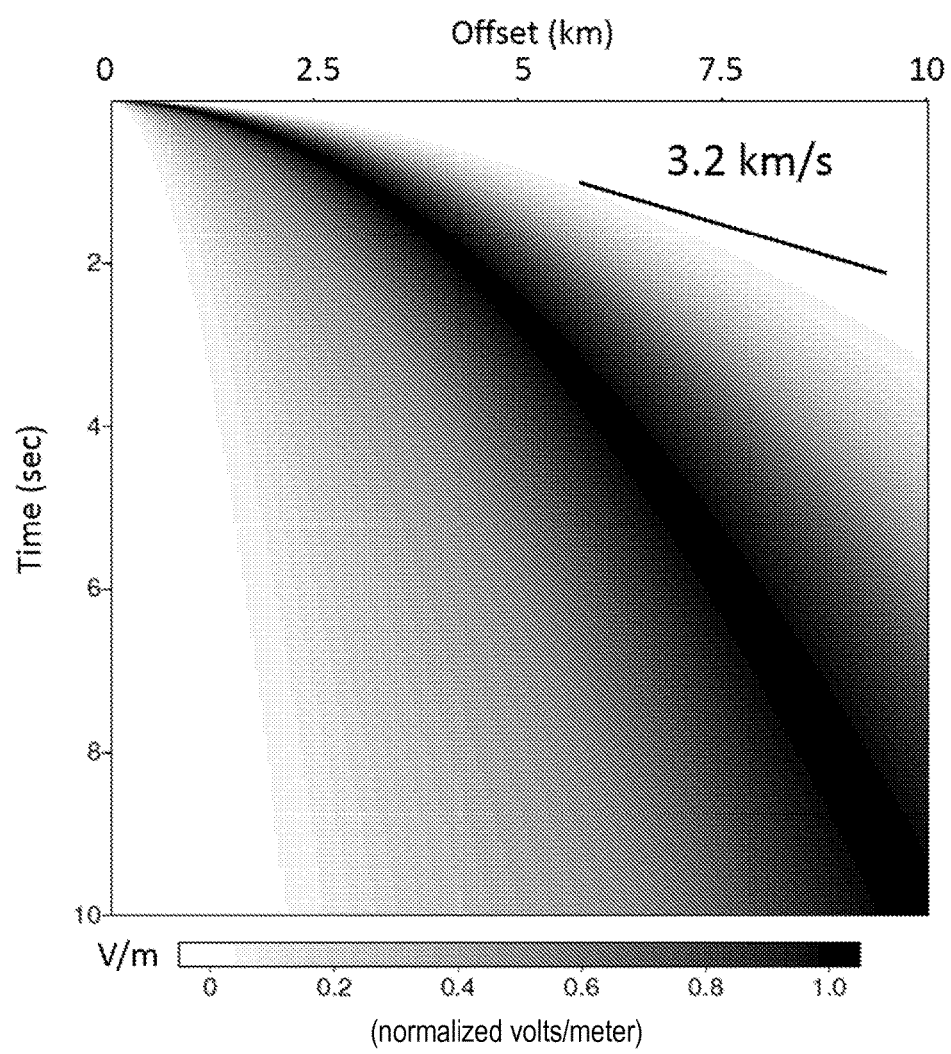
Figure 2C:
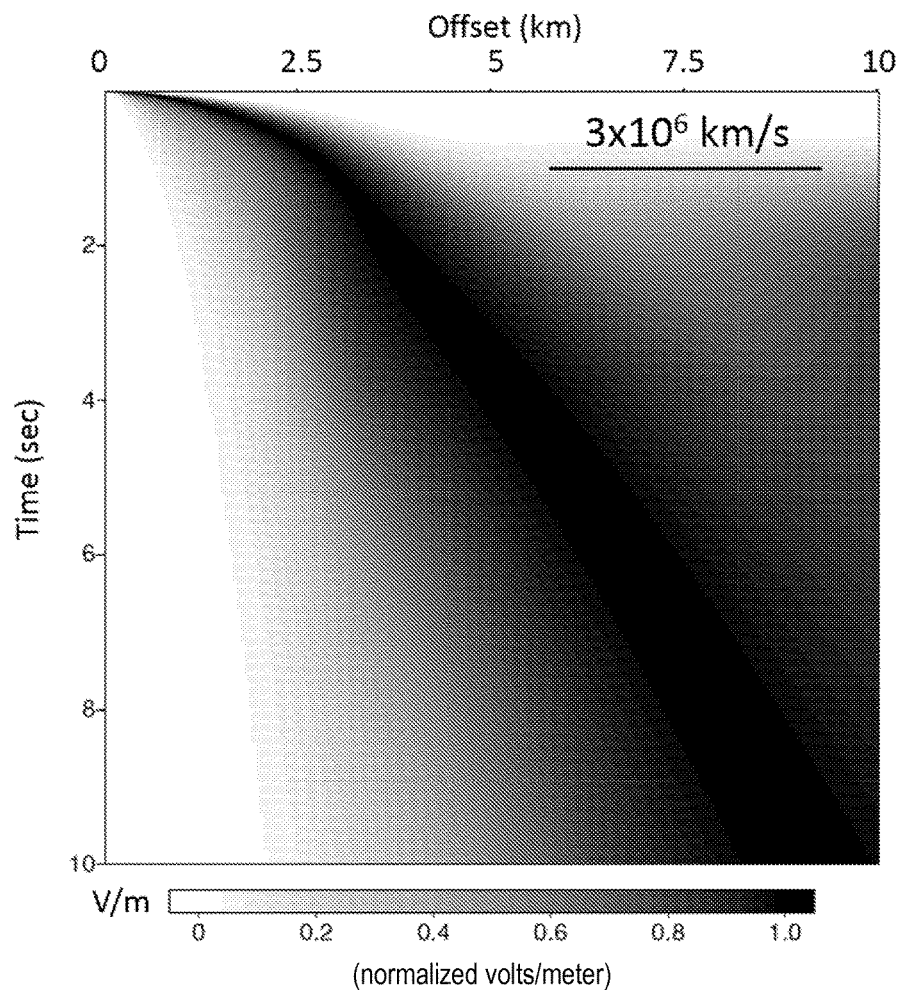
Figure 2D:
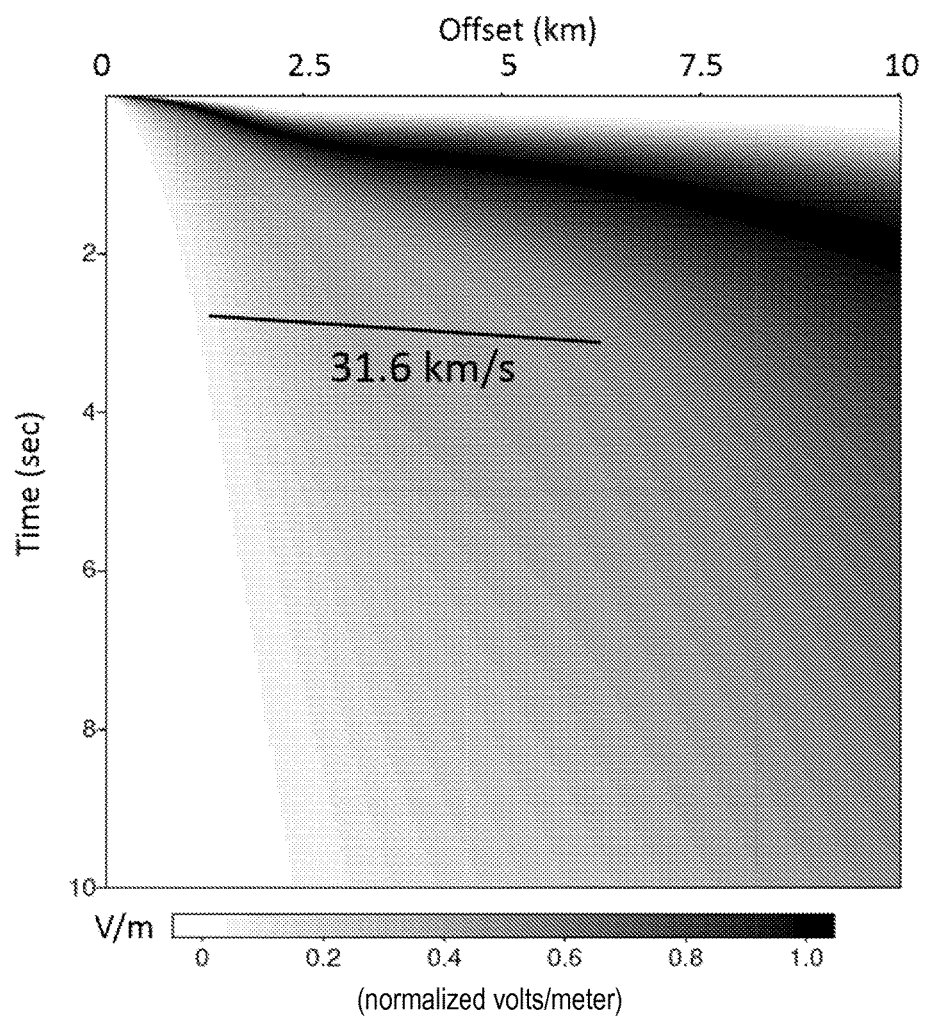
Figure 2E:
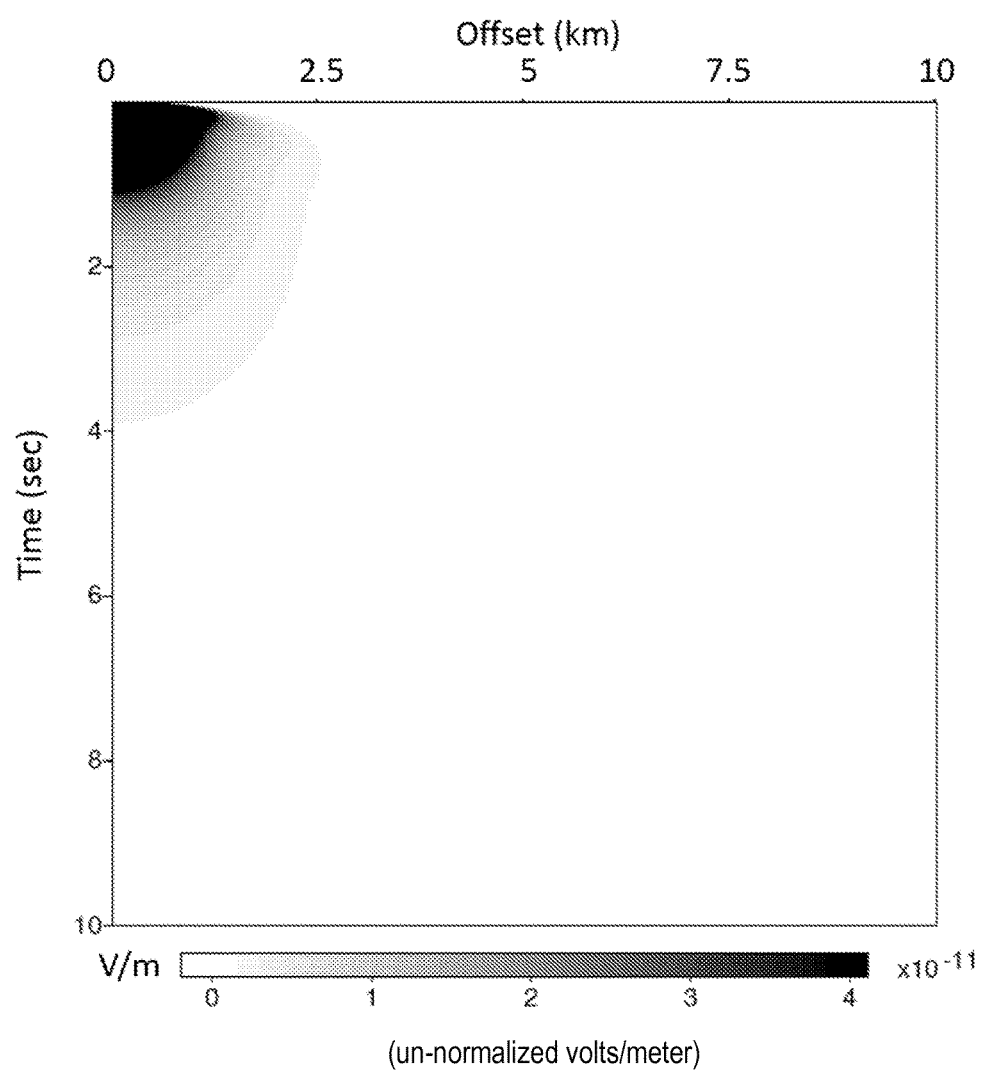
Figure 2F:
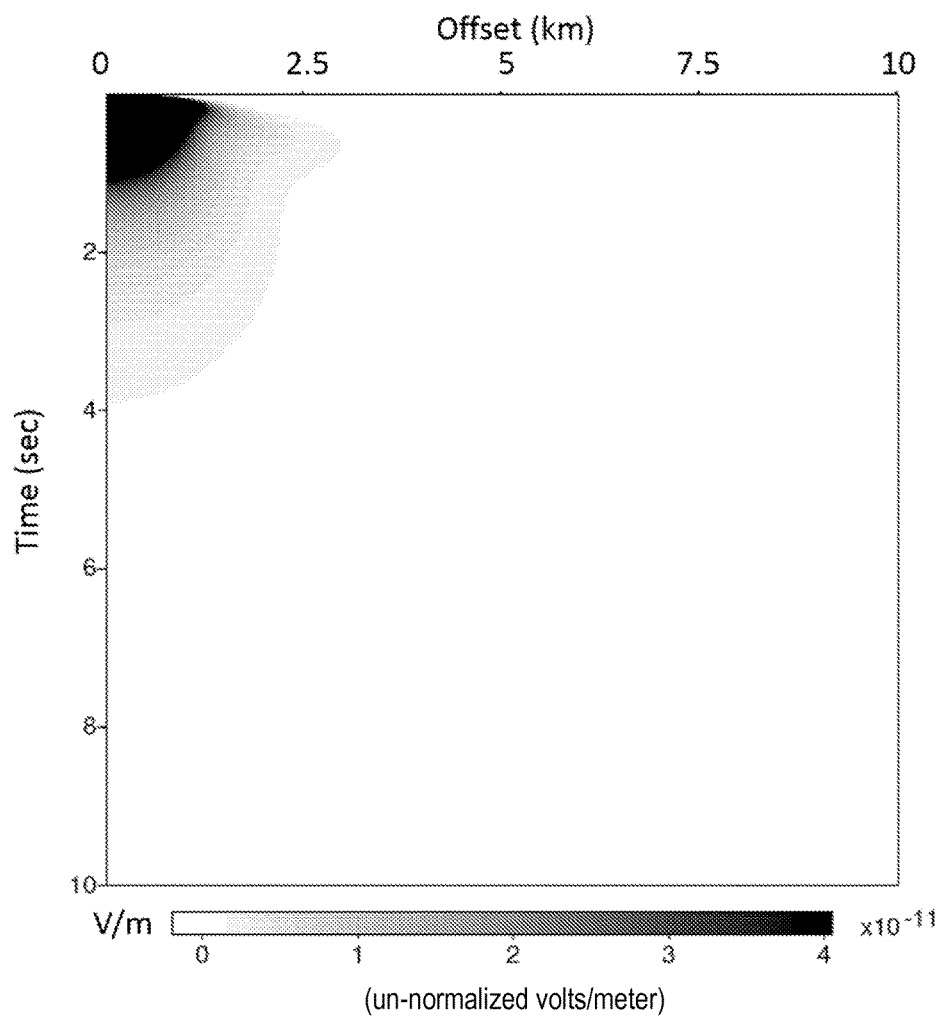
Figure 2G:
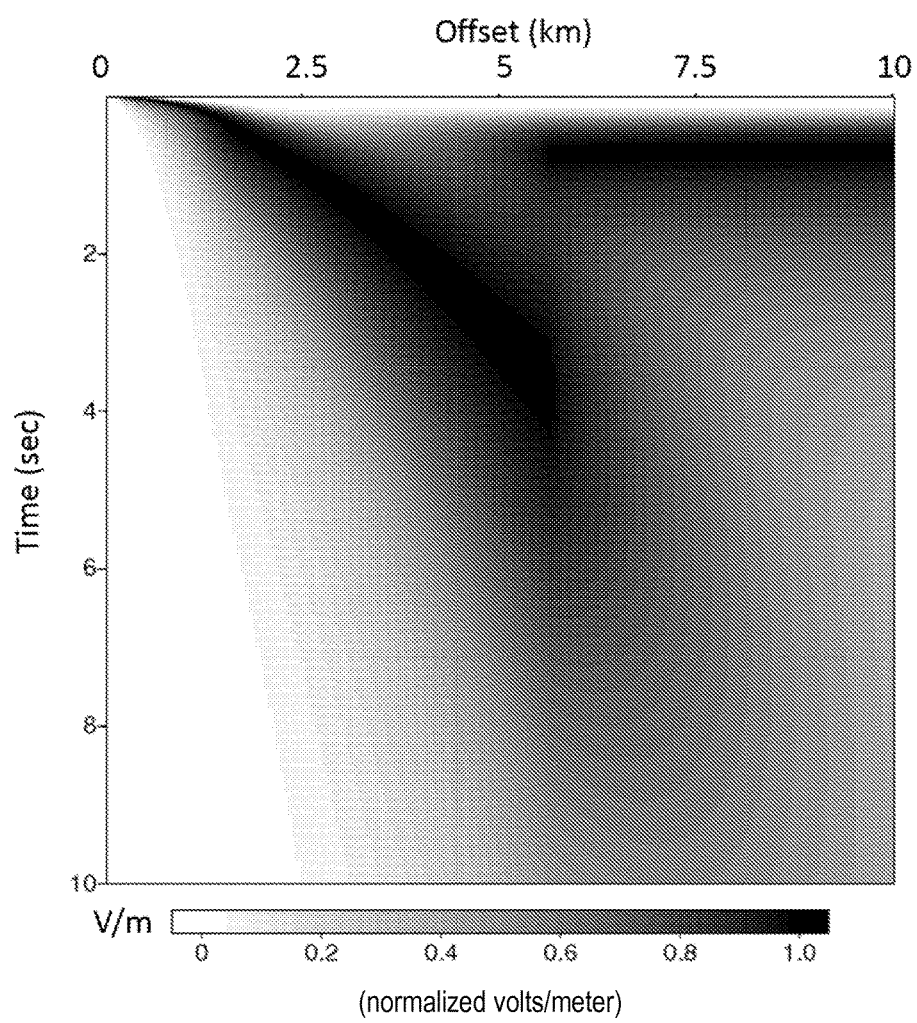
Figure 2H:
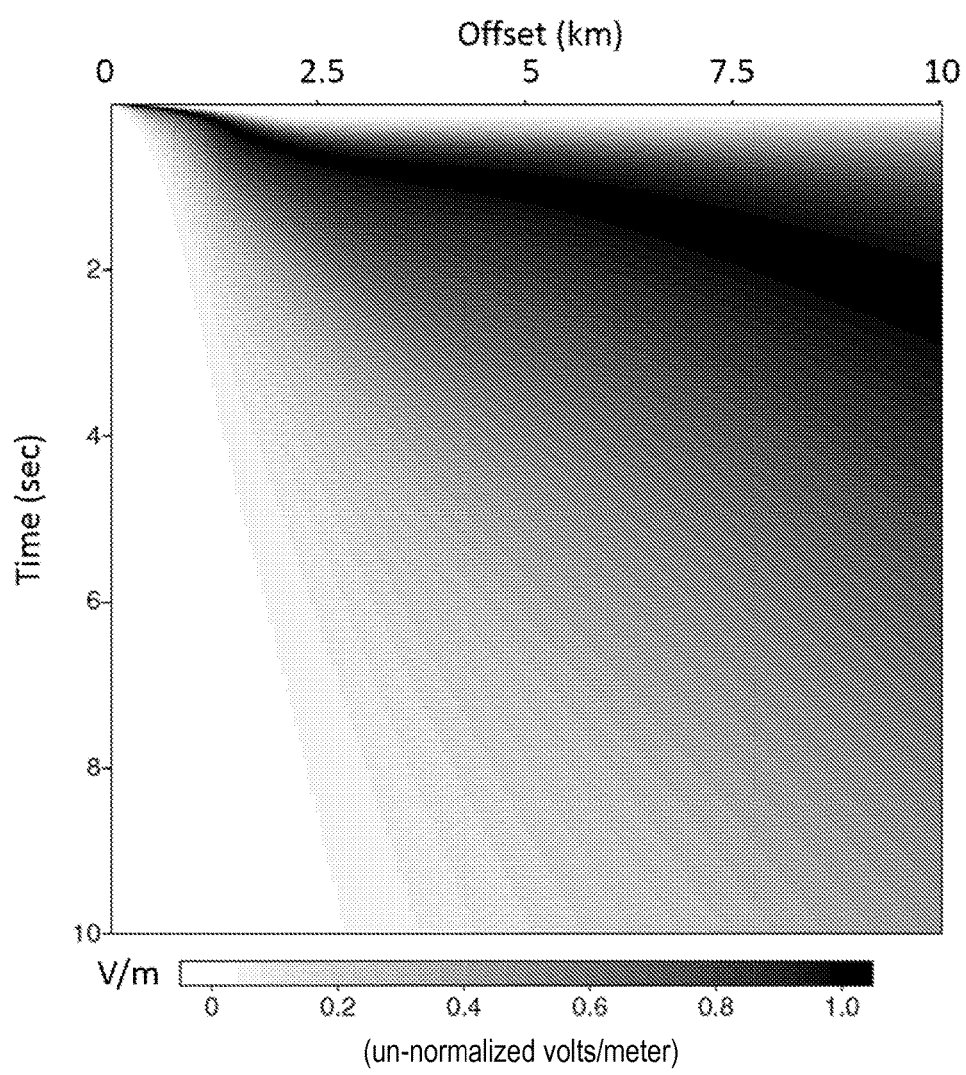

The figures may be understood as a buildup of the canonical model, with FIG. 2A showing the computation for whole space seawater (no sediments, air, or reservoir), FIG. 2B adding sediment (seawater over sediment), FIG. 2C adding air (air over seawater over sediment), and FIG. 2D adding the reservoir. (In each case, a line is added to the numerical simulation display, with a slope showing a typical moveout velocity for that numerical data.) FIGS. 2E and 2F are equivalent to FIGS. 2C and 2D, but without normalization; it is clear that without normalization, the different moveouts are not visible to the eye. With normalization, each element displays a distinctive moveout, similar to that of seismic data, but with significant dispersion. The differences between FIGS. 2C and 2D provide a visual basis for detection of the reservoir, based upon its moveout, but further application of seismic-style processing may prove useful, as discussed below. FIGS. 2G and 2H are equivalent to FIGS. 2C and 2D, but for the "shallow water model," i.e., FIG. 2G is for air over shallow seawater over sediment, and FIG. 2H add the reservoir to the arrangement of FIG. 2G.

Low-frequency EM body-wave phase slowness (inverse of velocity) for a homogeneous non-magnetic isotropic body has real part given by:

$$p = \sqrt{\frac{\mu_0}{2\rho\omega}} \qquad (1)$$

where $\mu_0$ is the magnetic permeability of free space, $\rho$ is the electrical resistivity of the medium, and $\omega$ is the angular frequency. Those skilled in the art will understand that subsurface anisotropic electrical resistivity may be accommodated by appropriate generalization of Equation (1).

Equation (1), along with analysis of a body wave interacting with an interface, leads to the following analysis of FIGS. 2A-2H. The "air wave" (FIG. 2C) propagates slowly from the source near the seafloor up through the seawater, refracts horizontally (following Snell's law) through the air at the speed of light in air, then propagates slowly back down to the receivers. This is evident in the early arrival at far offsets, which is clear in FIG. 2C, and even clearer in FIG. 2G, with its shallower water layer. For this air/water interface, the "critical angle" is very small (less than 1°); energy arriving from the source at larger angles ("post-critical incidence") arrives more slowly, accounting, in concert with dispersion, for the smear of later arrivals in FIGS. 2C and 2G.

Similarly in FIG. 2D and FIG. 2H, where the reservoir is present, the "reservoir wave" propagates slowly down to the reservoir though the sediments, refracts rapidly through the reservoir, then propagates slowly back up to the receivers. For this interface, the critical angle is about 6°; waves with post-critical incidence arrive later, as shown in FIGS. 2D and 2H. Further, the reservoir layer is so thin that it acts as a "wave-guide", with a complicated interaction between the incident wave, and the top- and bottom-of the reservoir layer. It is observed in the CSEM literature that in thin-layer models (like the present "canonical model") numerical simulations are "T-equivalent". That is, the simulations are virtually identical for different models with T (=resistivity× thickness of the reservoir) held constant. Hence, embodiments should not aspire to recovering an accurate value of reservoir resistivity itself, without an independent estimate of reservoir thickness, for example via seismic imaging. Keeping in mind these complications, such behavior nevertheless indicates that identifying the reservoir by means of seismic-style processing, which recognizes the different moveouts of various modes, as disclosed herein, rather than their amplitudes as is conventionally done in CSEM, is feasible. Because the air wave is excited impulsively, rather than continuously, the air wave arrives late, with very fast moveout, and is easily distinguished from the signal.

FIG. 3 shows a frequency spectrum for the canonical model of FIG. 2D. Note the loss of high frequency with offset, despite the trace normalization in FIG. 3. This loss of high-frequency signal is typical of EM wave propagation; a similar attenuation effect occurs in seismic data, but with seismic data it is much weaker. Further, note that the refracted waves (air, reservoir) preserve higher frequency content at the longer offsets, since in these fast refracting layers, the wavelength is longer (for each frequency) and so the attenuation is less.

Figure 4A:
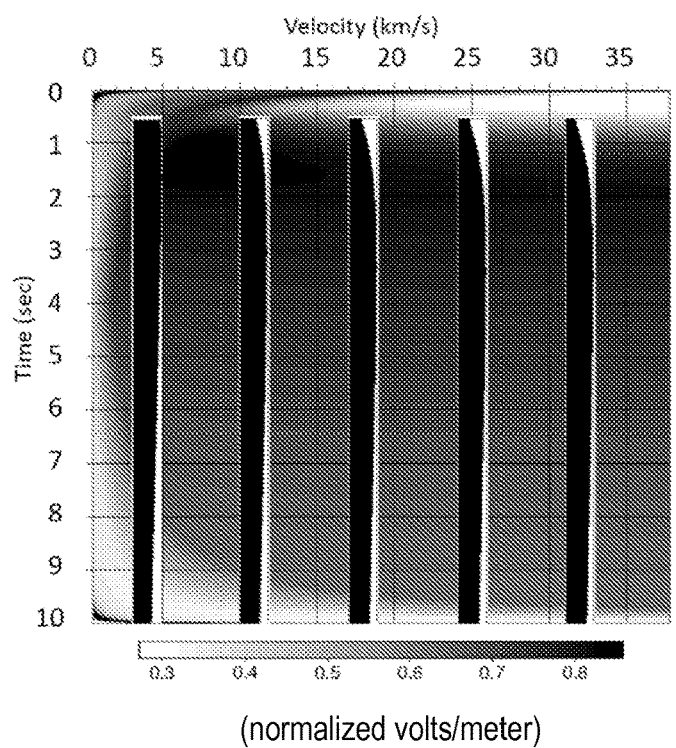
FIGS. 4A and 4B show output of semblance processing applied to EM data in accordance with principles disclosed herein.
Figure 4B:
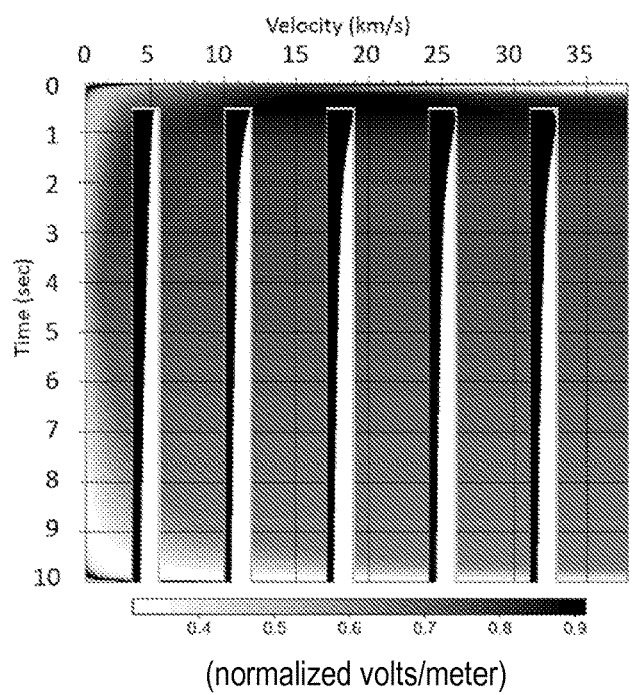

The EM data processor 106 may estimate velocities, for example, by computing semblance along any of a number of velocity trajectories in time vs offset (e.g., hyperbolic or linear), for example, using the SUVELAN program. Other measures to compute the resemblance of traces along the chosen moveout trajectory may also be used. In real data, these computations could be performed against any of a variety of source-receiver gathers (e.g. Common MidPoint, Common Receiver, Common Source, etc.); these are all equivalent in the present 1D model. FIGS. 4A and 4B show output of the semblance processing for linear moveout trajectories, in FIG. 4A for the air-over-sea-over-sediment model (no reservoir), and in FIG. 4B for the canonical model (with the reservoir) (i.e., FIGS. 2C and 2D respectively).

Overlaid on the semblance plots are limited-range (1-10 km) Constant Velocity Stacks computed at 3, 10, 17, 24, and 31 km/s. There are notable differences in both semblance plots and stacks, between the models without and with reservoir. The differences suggest the ability to detect the reservoir on the basis of its moveout, rather than its amplitude (as in CSEM). The detection does not rely upon forming the numerical difference between on-reservoir and off-reservoir datasets. However, the plots may not be useful for picking stacking velocities because the EM velocities are so dispersive.

The EM data processor 106 may compute normal moveout (NMO) corrections, for example using program SUNMO, which shifts arrivals according to an arbitrary velocity (or slowness) function of time and common depth point (CDP). While SUNMO computes NMO corrections entirely in the time domain, it may be modified to perform computations in the frequency domain, enabling a natural allowance for the high dispersion of EM waves. For example, for each frequency, a velocity may be computed with fixed electrical resistivity, using Equation 1, and the data for that frequency may be corrected with that (frequency-dependent) velocity. Upon conversion back into the time domain, the output is the NMO correction consistent with an input resistivity value. The NMO correction, as modified above for resistivity, is referred to herein as the "emNMO" (electromagnetic NMO) correction.

Figure 4C:
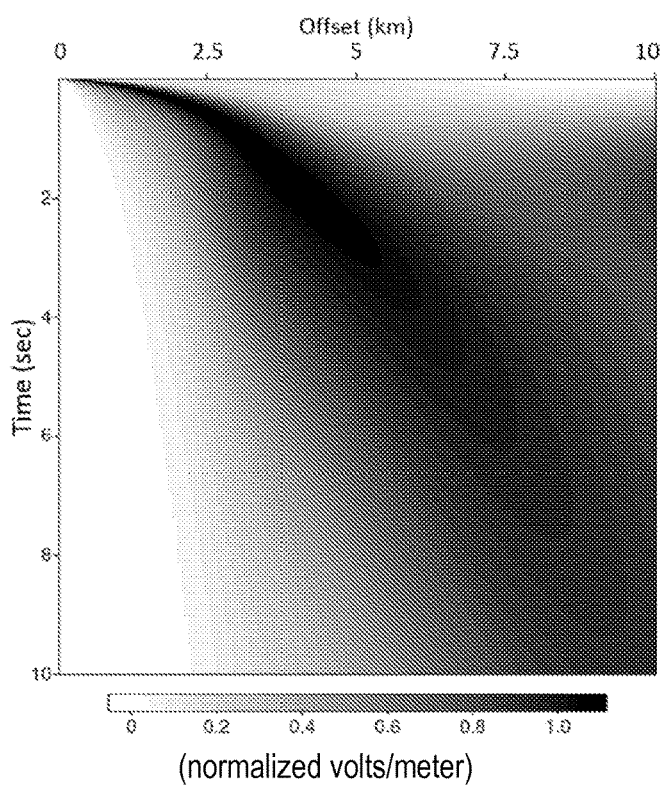
FIGS. 4C and 4D show output of modified moveout correction in accordance with principles disclosed herein.
Figure 4D:
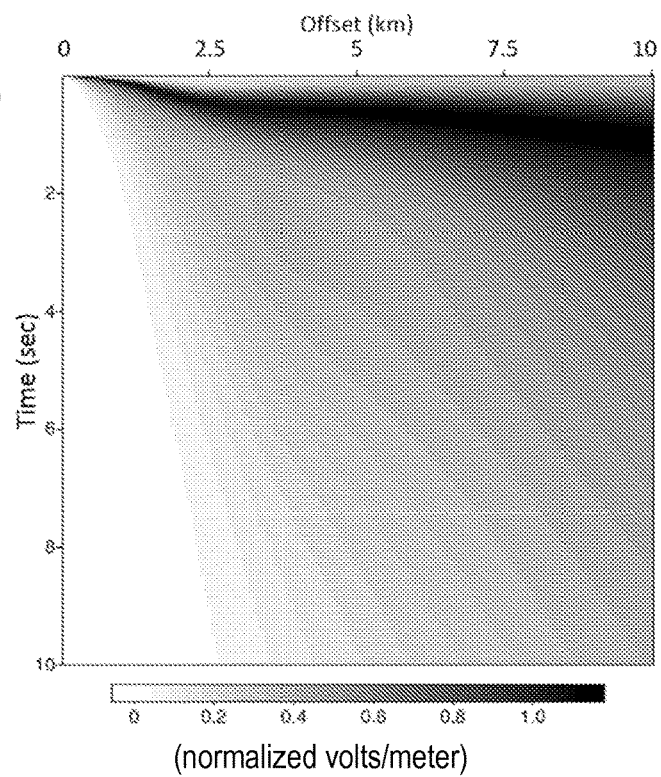

As with seismic NMO correction, the goal is to identify corrections that "flatten" the data, rendering it invariant with offset. FIGS. 4C and 4D show emNMO corrections computed for linear moveout at 100 Ohm-m (the resistivity of the reservoir in the canonical model). FIG. 4C shows that the moveout of the air-over-sea-over-sediment model (no reservoir) is poorly flattened by 100 Ohm-m resistivity, whereas FIG. 4D shows that the moveout of the canonical model with the reservoir is approximately flattened by the 100 Ohm-m resistivity. Thus, FIG. 4D is consistent with the presence of hydrocarbons, while FIG. 4C is not. Program emNMO may be extended into a resistivity-analysis program, analogous to the seismic velocity analysis program SUVELAN, for example by performing the emNMO analysis at each of a spectrum of resistivities, evaluating the results at each resistivity with a semblance calculation.

Figure 5A:
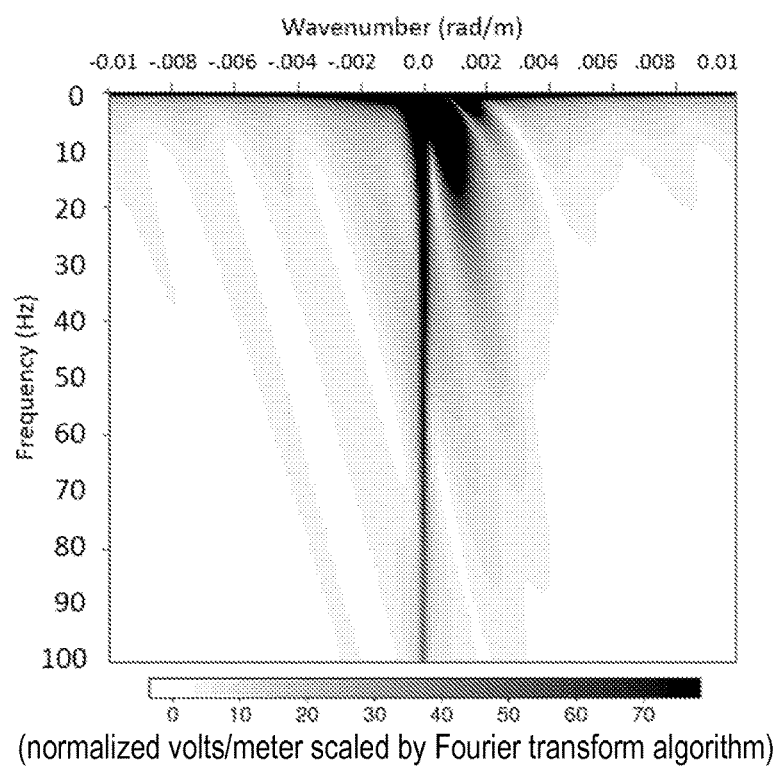
FIGS. 5A and 5B show plots of f-k transformations applied to EM data in accordance with principles disclosed herein.
Figure 5B:
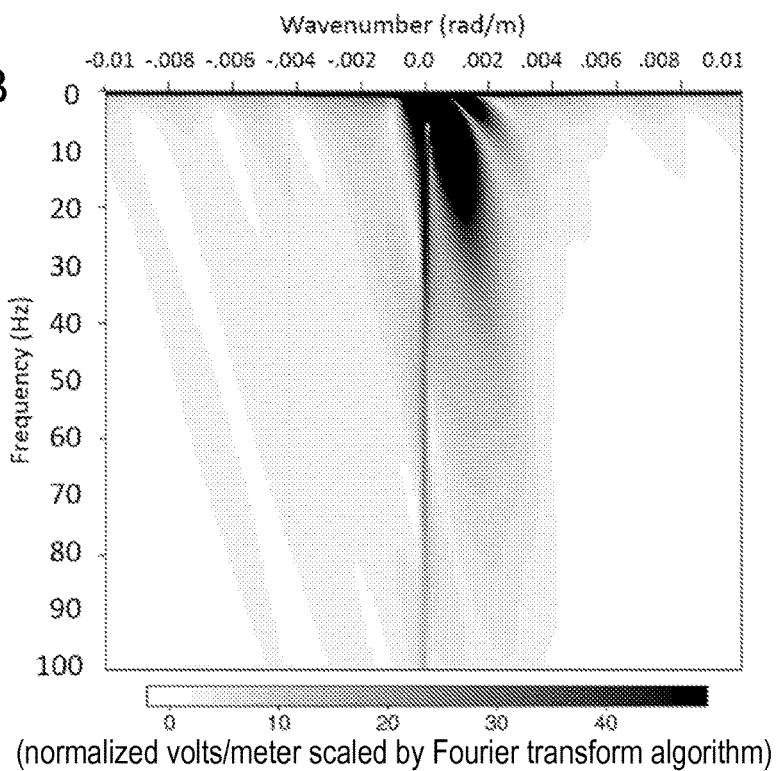

The EM data processor 106 may compute the f-k amplitude spectrum (e.g., using program SUSPECFK). FIGS. 5A and 5B show output from this procedure, in FIG. 5A for the air-over-sea-over-sediment model, and in FIG. 5B for the canonical model (with the reservoir) (i.e., FIGS. 2C and 2D). This plot shows differences due to the reservoir, but as implemented, they are not necessarily diagnostic of the presence of the reservoir. Other implementations of f-k analysis may offer enhanced detection possibilities.

Figure 6A:
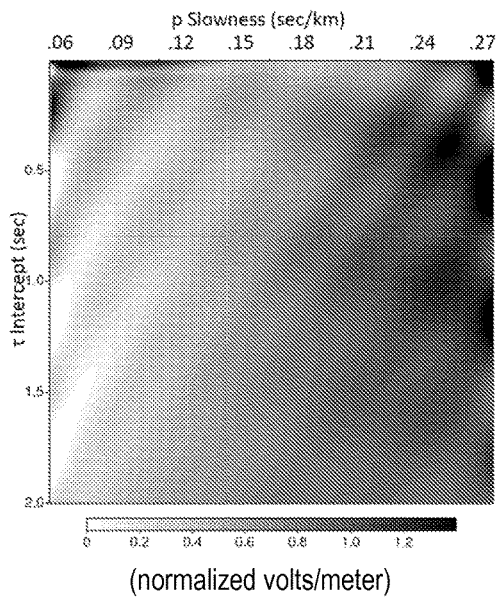
FIGS. 6A and 6B show plots of Radon transformations applied to EM data in accordance with principles disclosed herein.
Figure 6B:
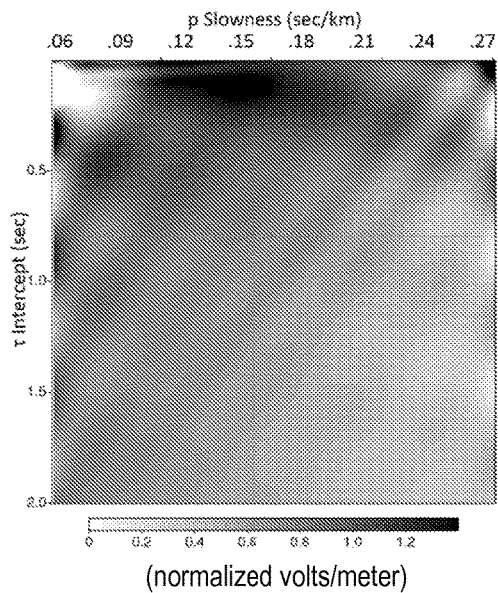

The EM data processor 106 may compute Radon transforms, for example using program SURADON. Radon transforms are integrals along any of a number of trajectories in time vs offset (e.g., hyperbolic or linear); a refracted arrival would appear differently in each of these various realizations. Radon transforms are shown (for the air-over-sea-over-sediment model (without reservoir), FIG. 2C, and for the canonical model (with reservoir), FIG. 2D) in FIGS. 6A and 6B respectively. The present illustration is restricted to Radon transforms with a linear trajectory in time vs offset, so-called "τ-p" transforms (where τ is time-intercept, and p is horizontal slowness), so that the refracted reservoir arrival should, in the absence of dispersion and post-critical incidence, approximate a point in the τ-p domain. Dispersion and post-critical incidence smear this point considerably, as shown in FIG. 6B.

The EM data processor 106 may set the number of p values equal to the number of offsets (e.g., 200), and may choose the p range to bracket slowness of interest: (in this case: 0.03-0.27) s/km (corresponding to 33-4 km/s). FIGS. 6A and 6B show that strong energy is present between 0.05-0.18 s/km (5-20 km/s) when the reservoir is present, and absent when the reservoir is absent; this corresponds to phase velocities of waves refracting along the reservoir (ρ=100.0 Ohm-m) at 0.025-0.4 Hz.

Figure 7A:
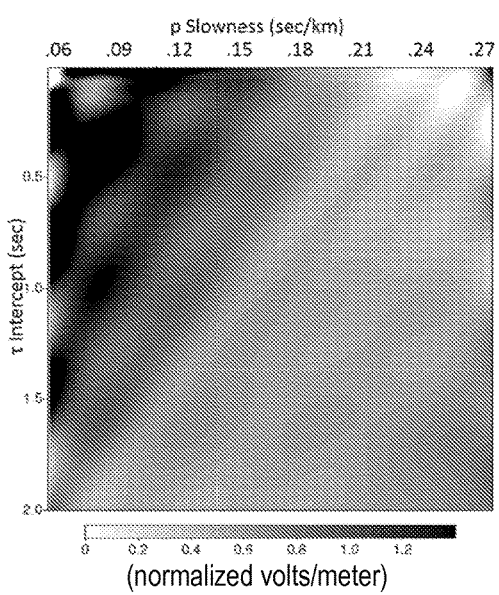
FIGS. 7A and 7B show plots of Radon transformations applied to EM data of a shallow water model in accordance with principles disclosed herein.
Figure 7B:
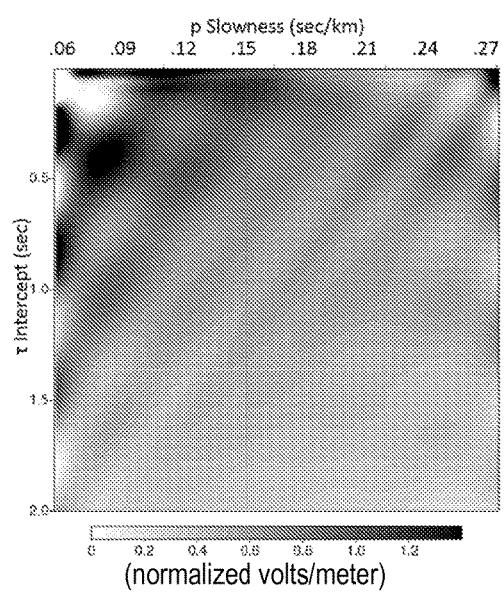

The result for the shallow water model shown in FIGS. 7A and 7B (for the air-over-sea-over-sediment model in FIG. 7A, and for the canonical model with reservoir in FIG. 7B) is less clear. This shows that the Radon transform, as implemented in SURADON, can be frustrated by air wave interference. Embodiments of the EM data processor 106 can refine the algorithm to solve this problem, since the differences are clear in the time-offset domain.

The SURADON program computes the forward Radon transform using a least squares representation of the transform in the frequency domain. This method is well-suited to EM, because it enables a natural allowance for the high dispersion of EM waves. After converting the data from the time domain to the frequency domain, SURADON computes slowness, one frequency at a time. The EM data processor 106 may modify the Radon transform, e.g., by converting horizontal slowness to the square root of conductivity (inverse of resistivity) at each frequency, by dividing each horizontal slowness by $\sqrt{(\mu_0/2\omega)}$ (c.f. Equation. (1)). (As written, the slowness in Equation (1) refers to body-wave propagation in any direction, but it may be applied without modification, as horizontal slowness, to this context of horizontal refraction.) Upon conversion back into the time domain, the output is intercept time τ versus the square root of conductivity $\sqrt{(1/\rho)}$. This output may be further transformed to a display of τ vs resistivity ρ itself. Those skilled in the art will appreciate that there will be other implementations, and other particular techniques based on seismic practice, perhaps modified to account for EM dispersion, post-critical incidence, and attenuation, for transforming the data, as recorded, into a domain of time (or depth) vs resistivity (or a function of resistivity).

Figure 8A:
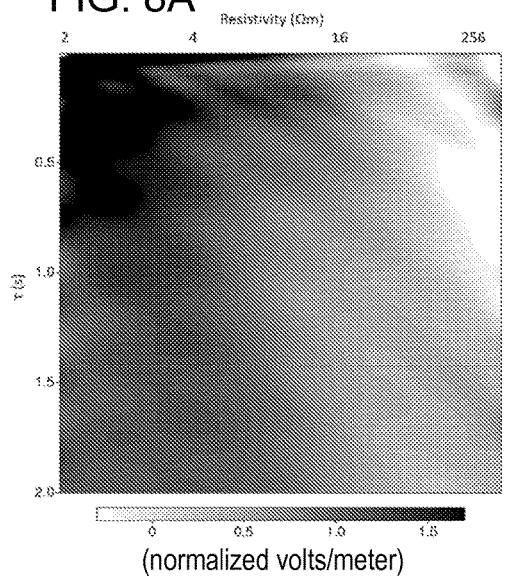
FIGS. 8A and 8B show plots of modified Radon transforms applied to EM data in accordance with principles disclosed herein.
Figure 8B:
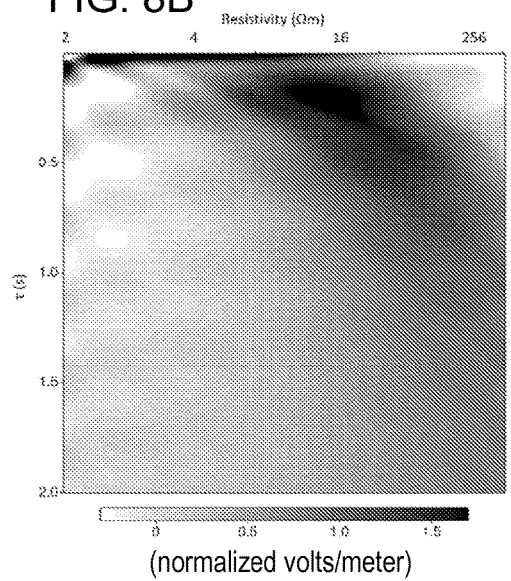

The Radon transform, as modified above for resistivity, is referred to herein as the "emRadon" (electromagnetic Radon) transform. As with the native Radon transform, the integrals may be performed along any trajectory in time-offset space. FIGS. 8A and 8B show emRadon transforms computed along a linear τ-p trajectory, over 200 values of $\sqrt{(1/\rho)}$, from 0.0036 to 0.72 $\sqrt{(Siemens/m)}$. Strong energy at $\rho$=6-100 Ohm-m (at times less than 1 second) is present for the canonical model with the reservoir (FIG. 8B), and absent for the air-over-sea-over-sediment model (FIG. 8A). Thus, FIG. 8B constitutes a crude representation (in time) of the resistivity of the subsurface, showing the presence of the reservoir. It may be converted to a crude representation in depth, by use of an appropriate velocity for vertically traveling EM waves in brine-saturated sediments.

Figure 8C:
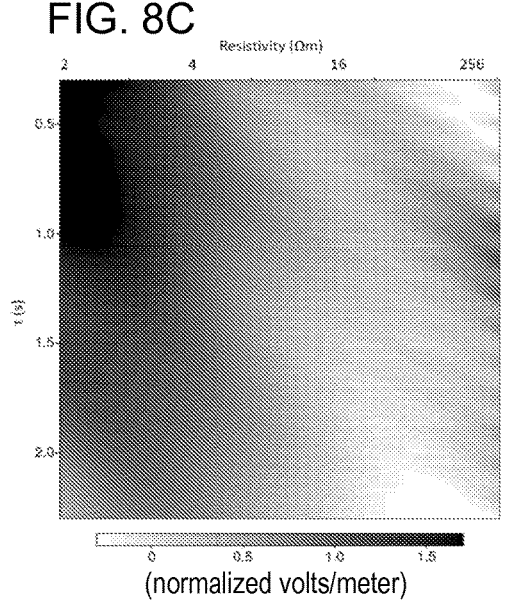
FIGS. 8C and 8D shows plots of offset and time restricted modified Radon transforms applied to EM data in accordance with principles disclosed herein.
Figure 8D:
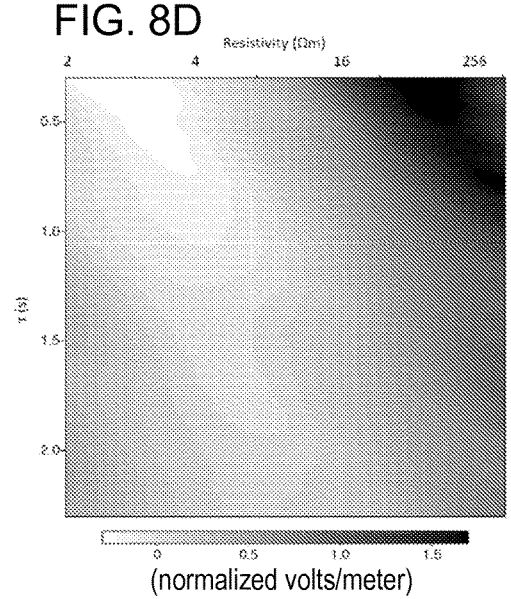

FIGS. 8C and 8D show restricted offset (2.5-9 km) and time (0.3-10 s) transforms of FIGS. 2C and 2D, illustrating that time and/or offset restrictions may be employed to focus the transform where the data shows (linear) moveout of interest. For this canonical model, the reservoir wave does not become dominant before 2.5 km offset while the air wave strengthens at 9 km. Further, the bulk of reservoir wave energy does not arrive before 0.3 s. Hence, it may be useful to restrict the emRadon integrals to these intervals in time and offset. In similar ways, frequency restrictions, or other modifications to standard seismic processing, may be useful.

Thus, the EM data processor 106 applies seismic-style processing (without inversion) to EM data, exploiting the moveout of the EM data: The processing may include, for example, conventional or modified velocity (semblance) analysis and stacking, f-k transform and filtering, and/or conventional or modified Radon transforms. The Radon transform may be the most useful for detecting hydrocarbons in the subsurface, and the modified Radon transform disclosed herein produces useful representations of the subsurface values of electrical resistivity.

FIG. 9 shows a flow diagram for a method 900 for acquiring and processing EM data in accordance with principles disclosed herein. Though depicted sequentially as a matter of convenience, at least some of the actions shown may be performed in a different order and/or performed in parallel. Additionally, some embodiments may perform only some of the actions shown. In some embodiments, at least some operations of the method 900, as well as other operations described herein, can be implemented as instructions stored in a computer-readable medium and executed by one or more processors.

In block 902, the impulsive EM source 102 is activated at a selected location. The EM pulse generated by EM source 102 induces EM energy in the formations 108. In practice in the field, the impulse may be an abrupt transition between two voltage-differences (for example, across the poles of a dipole antenna); the time-derivative of such a voltage-step is an impulse. In this case, the data recorded needs to be time-differentiated prior to the present analysis; the numerical noise thereby introduced is not a problem, as it has different frequency and moveout characteristics than the signal. The "impulse" need not be mathematically exact, so long as it's duration is short compared to the expected EM travel times to the suspected reservoir and back (at the closest offset), and to the time-interval before the next source-activation. The impulsive source may be activated in the field as a simple impulse, or via a more complicated source signature (such as a Pseudo-Random Binary Sequence) which is subsequently pre-processed to yield an approximate impulse. Following the activation of the source, the source is moved to a new selected location, and activated again, and the recording in block 904 is repeated. Successive activations need not have the same polarity, or even the same strength. The time-interval between successive activations of the source should be longer than the expected EM travel times to the suspected reservoir and back, at the furthest offset, although this is not strictly required.

In block 904, the EM receivers 104 (FIG. 1) detect the EM energy induced in the formations 108, and the system 100 records the signals detected by the EM receivers 104. The receivers may be distributed about the surface, or the seafloor, along a line or across and area, enabling 2D or 3D subsurface analysis, resp. The receivers should be spaced with appropriate minimum and maximum offsets, with spacing so as to provide spatially un-aliased reception. If the data are recorded at discrete time samples, the recording should be temporally un-aliased. Over-sampling, in both space and time, can be advantageous. The signals detected by the EM receivers 104 may be transmitted via conductive, wireless, or other data transfer media to a device the records the signals, in digital or analog form, on computer-readable media. For successive activations of the source 102, some or all of the receivers 104 may or may not be moved to new locations.

In block 906, the EM data processor 106 applies seismic-style processing to the recorded EM data. The processing may exploit the moveout of ISEM data via (for example) application of conventional or modified velocity (semblance) analysis and stacking, f-k transforms and filtering; and/or Radon transformations as disclosed herein. The processing may be applied to any of a number of subsets of the data (such as Common-MidPoint gathers, Common Source gathers, or Common Receiver gathers), containing a selected number of recorded traces. The processing may include retrieval of EM data from computer-readable media and application of gain control processing prior to the velocity and/or other seismic-style analysis disclosed herein. Results of processing in block 906 may be stored in computer-readable media for display and/or use in further processing.

In block 908, results of the processed EM data may be rendered for display and/or provided to additional data processing systems for further processing and analysis. The processed EM data may include a representation of the formations irradiated by the EM source 102.

Figure 10:
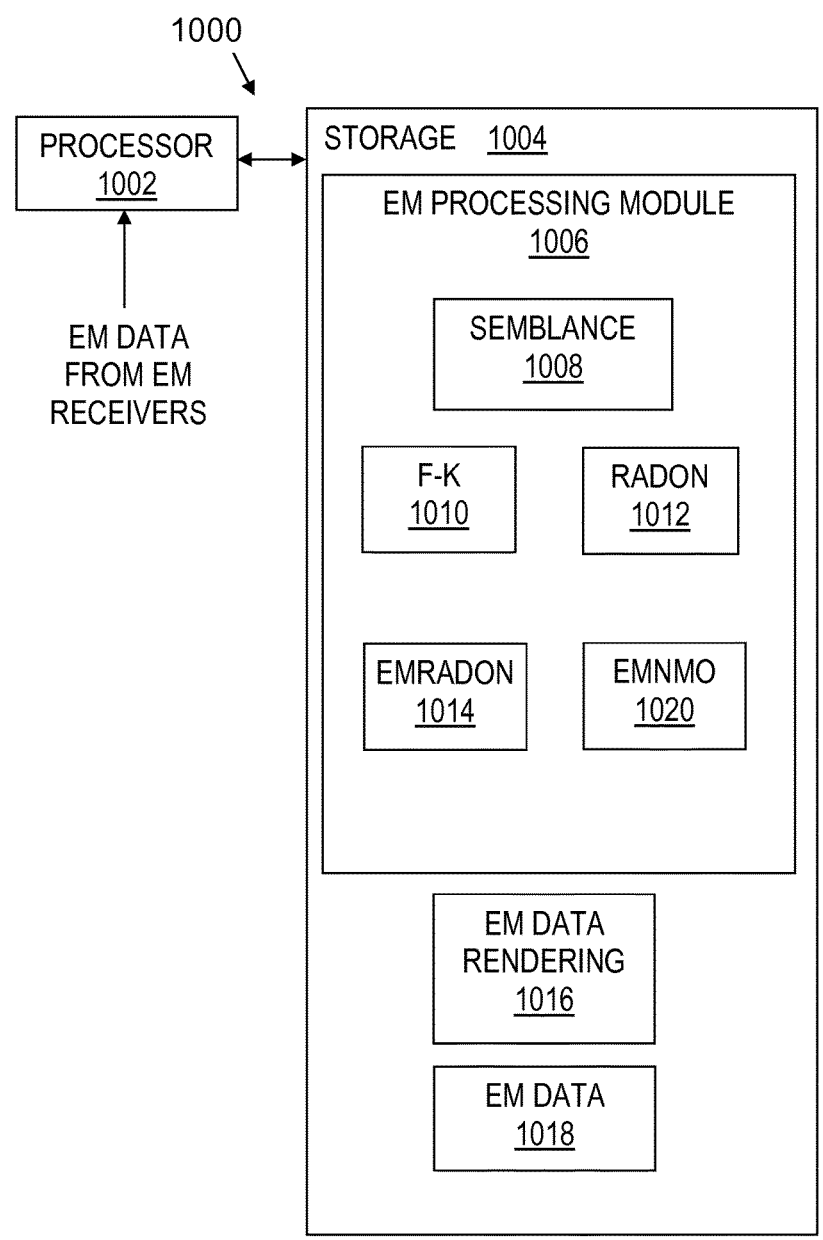
FIG. 10 shows a block diagram for an EM data processor in accordance with principles disclosed herein.

FIG. 10 shows a block diagram for the EM data processor 1000. The EM data processor 1000 includes a processor 1002 and storage 1004. A system including the EM data processor 1000 may also include various other components that have been omitted from FIG. 10 in the interest of clarity. For example, embodiments of the system may include a display device, such as a computer monitor, user input devices, network adapters, etc. Some embodiments of the EM data processor 1000 may be implemented as a computer, such as a desktop computer, a laptop computer, a server computer, a mainframe computer, or other suitable computing device.

The processor 1002 may include, for example, a general-purpose microprocessor, a digital signal processor, a microcontroller or other device capable of executing instructions retrieved from a computer-readable storage medium. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

The storage 1004 is a non-transitory computer-readable storage medium suitable for storing instructions executed by the processor 1002 and data (e.g., EM data 1018 received from EM receivers 104) processed by the processor 1002. The storage 1004 may include volatile storage such as random access memory, non-volatile storage (e.g., a hard drive, an optical storage device (e.g., CD or DVD), FLASH storage, read-only-memory), or combinations thereof.

The storage 1004 includes EM processing module 1006. The EM processing module 1006 includes instructions for processing EM data. The EM processing module 1006 may include a variety of "pre-processing" steps, familiar to those skilled in the art of seismic processing. The EM processing module 1006 may include semblance instructions 1008 for performing semblance processing of EM data as disclosed herein. The EM processing module 1006 may include f-k instructions 1010 for performing f-k transformation of EM data as disclosed herein. The EM processing module 1006 may include Radon instructions 1012 for performing Radon transformation of EM data as disclosed herein. The EM processing module 1006 may include emRadon instructions 1014 for performing emRadon transformation of EM data as disclosed herein. The EM processing module 1006 may include emNMO instructions 1020 for performing emNMO processing of EM data as disclosed herein.

The storage 1004 may also include EM data rendering instructions 1016 for rendering results generated by the EM processing module 1006 on a display device.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. A method for acquiring and processing electromagnetic data in subsurface formations, comprising:
    generating an electromagnetic pulse using an electromagnetic source at selected locations to induce electromagnetic energy in the subsurface formations;
    detecting the electromagnetic energy reflected by the subsurface formations using a plurality of electromagnetic receivers;
    producing a representation of the subsurface formations by processing signals output by the electromagnetic receivers, the processing based on differences in travel times of the electromagnetic energy between the subsurface formations and the electromagnetic receivers, according to distance between the source and each receiver, wherein the processing accounts for dispersion or attenuation of electromagnetic energy propagation; and
    utilizing said representation of the subsurface formations to detect and characterize presence of hydrocarbons in the subsurface formations,
    wherein the generation of the electromagnetic pulse is shorter in duration than a shortest travel time of the electromagnetic pulse between the electromagnetic source and any one of the electromagnetic receivers.

2. The method of claim 1, wherein the electromagnetic receivers are not spatially or temporally aliased.

3. The method of claim 1, wherein the processing comprises applying trace normalization to the signals output by the electromagnetic receivers.

4. The method of claim 1, wherein the processing comprises applying a Radon transform to the signals output by the electromagnetic receivers.

5. The method of claim 4, wherein the Radon transform is modified to convert horizontal slowness to a square root of conductivity at each frequency.

6. The method of claim 4, wherein the Radon transform is modified to convert horizontal slowness to resistivity.

7. The method of claim 4, wherein the Radon transform is modified to divide each value of horizontal slowness by $$\sqrt{\frac{\mu_0}{2\omega}},$$

where $\mu_0$ is magnetic permeability of free space and $\omega$ is angular frequency.

8. The method of claim 1, wherein the processing comprises estimating velocities of the electromagnetic energy based on the signals output by a plurality of the electromagnetic receivers.

9. The method of claim 8, wherein the processing comprises:
    applying a time correction function that computes a time correction (as a function of offset) separately for each of a spectrum of velocities; and
    determining a measure of resemblance of traces having the time correction, to select a velocity.

10. The method of claim 9, wherein the time correction function is linear in offset, with slope 1/velocity.

11. The method of claim 9, wherein the time correction function is non-linear in offset.

12. The method of claim 9, wherein the measure of resemblance is semblance.

13. The method of claim 8, wherein the processing comprises:
    applying a time correction function that computes a time correction (as a function of offset) separately at each of a spectrum of resistivities; and
    determining a measure of resemblance of traces having the time correction, to select a best resistivity.

14. The method of claim 13, wherein the measure of resemblance is semblance.

15. The method of claim 14 wherein computation of semblance multiplies a square root of resistivity by $$\sqrt{\frac{\mu_0}{2\omega}},$$

where $\mu_0$ is magnetic permeability of free space and $\omega$ is angular frequency.

16. The method of claim 14, wherein the time correction function is linear in offset, with slope 1/velocity.

17. The method of claim 14, wherein the time correction function is non-linear in offset.

18. The method of claim 9, wherein the time correction is computed separately for each frequency-component of each trace using a velocity function which is computed from resistivity.

19. The method of claim 1, wherein the processing comprises computing an f-k amplitude spectrum of the signals output by a plurality of the electromagnetic receivers.

20. The method of claim 1, wherein the processing does not include mathematical inversion of the signals output by the electromagnetic receivers.

21. The method of claim 1, wherein the time between generation of the electromagnetic pulse at each selected location is longer in duration than a longest travel time of the electromagnetic pulse between the electromagnetic source and any of the electromagnetic receivers selected for analysis.

22. A system for acquiring and processing electromagnetic data, comprising:
an electromagnetic source configured to generate an electromagnetic pulse that induces electromagnetic energy in subsurface formations;
a plurality of electromagnetic receivers configured to:
detect the electromagnetic energy reflected by the subsurface formations; and
output signals corresponding to detected electromagnetic energy reflected by the subsurface formations;
a processor configured to:
process the signals output by the electromagnetic receivers based on differences in travel times of the electromagnetic energy between the subsurface formations and a plurality of the electromagnetic receivers, and accounting for dispersion or attenuation of electromagnetic energy propagation;
produce a representation of the subsurface formations based on processed signals output by the electromagnetic receivers,
wherein the electromagnetic source is configured to generate an electromagnetic pulse with a duration that is shorter than a shortest travel time of the electromagnetic pulse between the electromagnetic source and any one of the electromagnetic receivers.

23. The system of claim 22, wherein the electromagnetic receivers are spaced so as not to be spatially or temporally aliased.

24. The system of claim 22, wherein the processor is configured to apply a Radon transform to the output signals corresponding to detected electromagnetic energy.

25. The system of claim 24, wherein the Radon transform is modified to convert horizontal slowness to a square root of conductivity at each frequency.

26. The system of claim 24, wherein the Radon transform is modified to divide each value of horizontal slowness by $$\sqrt{\frac{\mu_0}{2\omega}},$$

where $\mu_0$ is magnetic permeability of free space and $\omega$ is angular frequency.

27. The system of claim 22, wherein the processor is configured to:
apply trace normalization to the output signals corresponding to detected electromagnetic energy;
estimate velocities of the electromagnetic energy based on the output signals corresponding to detected electromagnetic energy; or
compute an f-k amplitude spectrum of the output signals corresponding to detected electromagnetic energy.

28. The system of claim 22, wherein the processor is configured to not apply inversion to the output signals corresponding to detected electromagnetic energy.

29. A non-transitory computer-readable medium encoded with instructions that when executed by a processor cause the processor to:
receive signals detected by a plurality of electromagnetic receivers, the signals corresponding to electromagnetic energy reflected by subsurface formations and detected by the electromagnetic receivers;
process the signals, based on differences in travel times of the electromagnetic energy between the subsurface formations and the electromagnetic receivers, and accounting for dispersion or attenuation of electromagnetic energy propagation, to produce a representation of the subsurface formations, and to utilize said representation of the subsurface formations to detect and characterize presence of hydrocarbons in the subsurface formations;
apply trace normalization to the signals;
estimate velocities of the electromagnetic energy based on the signals;
compute an f-k amplitude spectrum of the signals;
apply a Radon transform to the signals; and
apply a Radon transform modified to convert horizontal slowness to a square root of conductivity at each frequency to the signals.

* * * * *